Sept. 24, 1940.  R. LEDRICH  2,215,760
FLOATING FISHING LINE
Filed Aug. 9, 1937

Robert Ledrich INVENTOR.
BY  N. S. Amstutz
ATTORNEY.

Patented Sept. 24, 1940

2,215,760

UNITED STATES PATENT OFFICE 2,215,760

FLOATING FISHING LINE

Robert Ledrich, Cuyahoga Falls, Ohio

Application August 9, 1937, Serial No. 158,234

1 Claim. (Cl. 91—70)

My invention relates to improvements in floating fishing lines and it more especially includes the features pointed out in the annexed claims.

The purpose of my invention is to provide a self-floating fishing line that will not sink; that is especially adapted for fly-casting; that will retain its flexibility and strength; that will remain on the surface of the water by reason of its non-moisture absorbing structure; that because of these novel features and the presence of a relatively permanent coating of a water resistant material or an impregnation the line will float and at the same time will withstand the wear of repeatedly passing through the pole guides, in casting, in hand retrieving or re-reeling; that will have a specific gravity less than water; will not be affected by grease, acid, oil, etc.; and that will not become sticky if warmed and will not become sun-checked.

All of these objects will be secured without the use of any messy and unsatisfactory applications of "dope" to the line as practiced heretofore.

With these and other ends in view I illustrate in the accompanying drawing such instances of adaptation as will disclose the broad features of the invention without limiting myself to the specific details shown thereon and described herein.

In practicing my invention I may use whatever equivalents or adaptations of materials, substances, etc., that the exigencies of varying service conditions may require without departing from the broad spirit of the invention.

A fishing line 1 of any desired natural or synthetic textile material may be coated with any one of many synthetic or other non-moisture absorbing substances 2.

The purpose of a coating 2 is to prevent the textile center from absorbing water. By doing this the line will be floatable and will not become "waterlogged." The line as a whole may be covered or the individual strands 3 may be coated as indicated at 4 or the threads themselves may be made impervious to moisture.

I have found that a thin covering of rubber prevents the center absorbing water. The center 1 is naturally floatable, but as soon as it absorbs water the line will sink.

A modified vinyl halide polymer known as Coroseal is used as a coating, even though its specific gravity taken alone is greater than water yet in its combined relation with the center it is less, thus making the line floatable.

I may coat a line in any desired manner by running it through a tubing machine with which is associated a supply of the coating or it may be dipped or run through a bath and it may be dyed any desired color for identification or other purposes.

Figure 1:
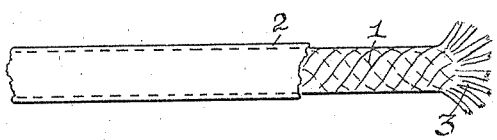
Fig. 1 is a side elevation of a fishing line on an enlarged scale.
Figure 2:
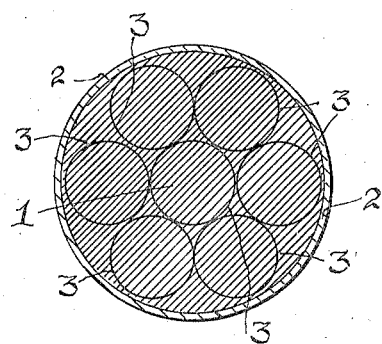
Fig. 2 is a diagrammatic cross section of a line made impervious to water.
Figure 3:
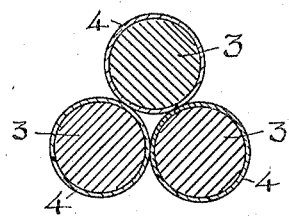
Fig. 3 is a modified cross section in which each strand of a line is made impervious to water.
Figure 4:
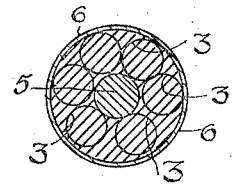
Fig. 4 is an enlarged cross section of a further modification.

A floatable line may also be formed, as instanced in Fig. 4 wherein the thin center 5 may be a rubber core of low specific gravity about which is braided a cotton covering. This covering may itself be impregnated with any desired non-hygroscopic substance and the outside may be formed of a layer 6 similar to the coating 2, Fig. 1.

I may use any desired material for impregnation or coating purposes that does not absorb moisture. These may be rubber compounds, cellulose, synthetic resins, casein compounds with cooperative solvents, etc. The outside surface may be finished in any desired manner, with a polished, or matt surface.

A modified vinyl halide polymer, known as Coroseal or any equivalent thereof may be used with any desired cooperative solvent. The compound is liquified by means of heat. It is then used as a coating or as an impregnating material. As an instance, Coroseal becomes liquid at about 135° F. and it is cured at about 255° F. in a few minutes.

Any floatable line intended for fly-casting must still retain enough weight at its outer end to spring the rod to produce a whip effect. The finished line may be 0.050 to 0.060 inch in diameter. A loose woven cotton line may have a specific gravity of .70 and a medium braided line .90. As Coroseal has a specific gravity of 1.30 a very thin coating or impregnation will produce a resultant specific gravity of the entire line below that of water which will cause the line to float.

When a "dope" dressing is used it only lasts for a very short time after which it must be renewed. The introduction of fly lines has brought about all kinds of dressings and dopes but without success in securing a really floatable line. A dressed line depends entirely for its effectiveness on surface tension. As soon as this is detroyed the line goes to the bottom. When a dressed line begins to sink it must be dried and doped again, after each immersion. From a practical standpoint the followers of Isaac Walton find it easier to lift a large number of feet of line from off the top of the water than to pull a very small length of line out of the water.

It has been found that when a line has taken in its full complement of water so that the line is completely wet, a .025 inch diameter line will sink as rapidly as a line nearly four times larger in diameter. A "dry" line, if its specific gravity is below that of water will float only as long as the surface tension or capillary repulsion is present in sufficient force. The present practice to keep the lines dry, as noted above, is to dope them with different kinds of greases.

The exact quantity of waterproofing material that lines of different structure may require is variable, depending on the treatment of the strands, the type of braiding, etc., suffice it to say. It must when added to the line formation have a specific gravity slightly less than water.

Synthetic resins of the phenol-formaldehyde type having a specific gravity of 1.25, a little less than that of Coroseal, may obviously be used to coat or impregnate a line to make it non-sinkable. In one form this may require equal weights of phenol and an aldehyde associated with an alkalizing agent. In another form the fusible resin may comprise ten percent less aldehyde than the phenol present to produce a synthetic resin that will maintain its fluidity over a long time so as to be available for coating and impregnating fly-casting fishing lines. The applied resin may be set or cured in any desired manner so as not to destroy the flexibility of the line.

A waterproofing cellulose compound may be used. Such compounds are well known. They include the use of a low nitrated gun cotton dissolved in ether and alcohol. By adding castor oil the liquid will be tempered and brittleness will be avoided. A nitro cellulose dissolved in any of its known solvents such as amylacetate acetone, methyl alcohol, etc., with a fat or oil to produce the desired fluidity constitutes a modified form of water proofing. A casein product called "Galalith" has water proofing characteristics. In a liquid form it may also be used.

What I claim is:

The process of forming a floatable fishing line which consists in impregnating the line in a water proofing compound including a modified vinyl halide polymer at a given temperature of approximately 135° F., and in such amount that the specific gravity of the treated line after curing will be less than the specific gravity of water and in a few minutes curing the line at a higher temperature approximately 255° F. so that the floatability of the line with its coating will be independent of surface tension.

ROBERT LEDRICH.